T. W. ROLPH
Sept. 15, 1931. LUMINAIR Re. 18,187
Original Filed Dec. 2, 1927
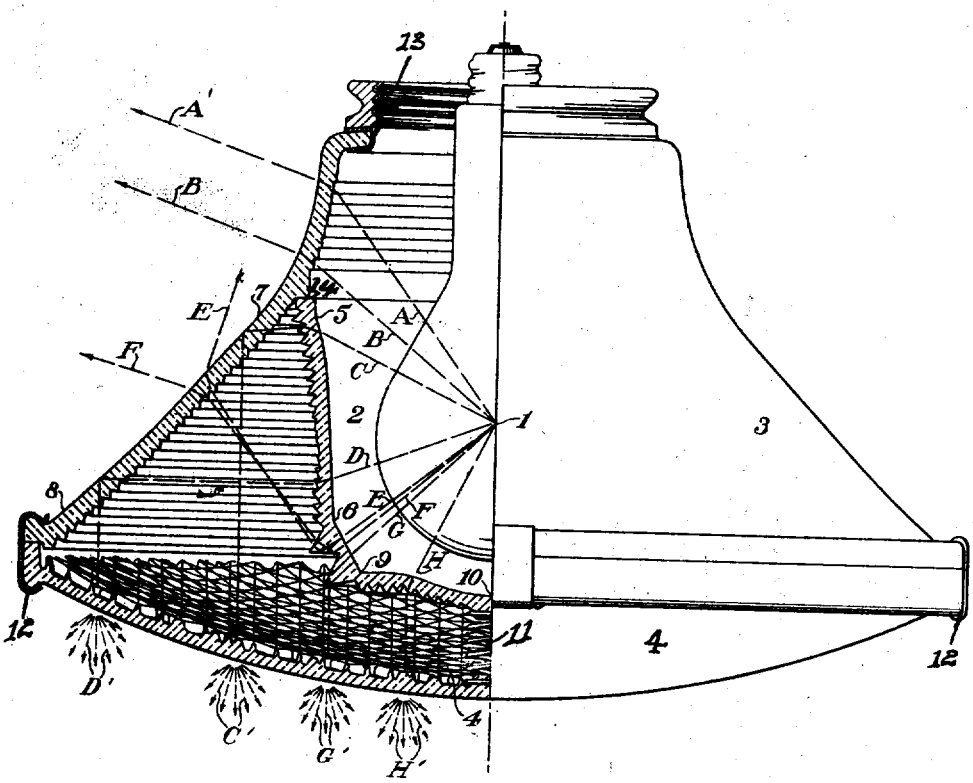
INVENTOR
Thomas W. Rolph
BY
Jacob Siberman
his ATTORNEY Reissued Sept. 15, 1931

Re. 18,187

UNITED STATES PATENT OFFICE

THOMAS W. ROLPH, OF NEWARK, OHIO, ASSIGNOR, BY MESNE ASSIGNMENTS, TO HOLOPHANE COMPANY, INC., OF NEW YORK, N. Y., A CORPORATION OF DELAWARE

LUMINAIR

Original application filed December 2, 1927, Serial No. 237,156. Renewed January 16, 1929. Original No. 1,724,726, dated August 13, 1929. Application for reissue filed July 21, 1931. Serial No. 553,020.

This invention relates to improvements in luminaires for general interior illumination and particularly luminaires for direct lighting as employed in class rooms, offices, and other places where light on the working plane is desired. In such lighting equipment it is desirable to have a large part of the light distributed in various desirable ways within the 0°–60° zone, 0° being measured directly downward or at the nadir and 60° being 30° below the horizontal. This light in the 0°–60° zone is the light which contributes very largely to the direct illumination of the lower part of the room, where the highest illumination is usually required.

It is also desirable in such luminaires to have the amount of light in the zone 60°–90° (90° being the horizontal) small. While this zone contributes something to the direct illumination it contributes much more to the unnecessary illumination of walls; furthermore, the light in this zone is the light which is most apt to interfere with vision because it strikes the eyes of the occupants of the room, directly from the luminair, at angles most nearly approaching the customary lines of vision.

Above the horizontal the light may be of a higher intensity than between 60°–90° but considerations of efficiency dictate that it should be of lower intensity than the direct light in the 0°–60° zone.

The invention also relates to a luminair having an outer envelope formed of pieces of glass secured together by external means and an enclosed piece of glass held against one of the outer glass parts by a spring interposed between the inner glass part and the other part of the envelope.

In order to meet the requirements set forth above with efficiency in the utilization of light, I have devised a luminair of unique construction.

The figure is an elevation bisected to show the construction in cross section. In the figure, 1 is a light source, here taken as a modern electric lamp, which lamp is surrounded by a cup 2, having a prismatic construction preferably, but not essentially, on its outer surface. The cup is held in place by a spring 11, which presses against the removable lower plate or bowl 4. The bowl is fastened by means of clips 12 to an upper or substantially fixed reflecting part 3. 13 indicates a holding ring which is adapted to be fastened to any sort of suspension or ceiling holder. The upper edge of the cup is in contact with a ledge on the reflector at 14. The inner surface of reflector 3 and bowl 4 are provided with a definite prismatic construction as hereinafter described. These prisms are shown on the interior surfaces of these members, and this is desirable from the point of view of having a unit with a smooth exterior, for purposes of freedom from dirt and dust and feasibility of cleansing when in operation or when taken down. It is not essential, however, that the prisms be on the inside of these outer covers but it is preferable.

In the figure the typical light rays A, B, C, D, E, F, G and H are shown in their paths from the light source through the various parts of the luminair until emitted. The typical ray A from the source 1 is incident on the upper part of reflector 3, the prisms of 3 at the point of incidence being so constructed as to permit ray A to be distributed in direction A′ as desired in the upper hemisphere. Slightly below point A is point B on the outer unit and the rays at this point likewise pass directly out of the unit in direction B′ for distribution in the upper hemisphere. Toward the center of the unit the cup 2 begins to be effective, so as to intercept the rays from the source 1. Within points 5 and 6 on the cup, the prisms on its outer surface receive rays C and D and refract them in generally horizontal directions to the outer surface 3. The prisms on the interior reflector 3 are adapted to receive such rays between points 7 and 8 on the outer reflector and deflect such rays in downward directions to the lower bowl or plate 4, and the light emerges in a smooth luminous distribution as shown at D′ and C′ as hereinafter described.

That portion of the cup 2 between points 6 and 9 may most efficiently be supplied with external reflecting prisms which split the light into two parts. A portion of this light, represented by typical rays E and F is reflected upward and strikes the reflecting prisms of 3 at such angles as to be transmitted. Typical light ray E tends to brighten up the ceiling and eliminate the possibility of a shadow directly above the unit. Typical light ray F forms a part of the light in the upper hemisphere which is spread out over the ceiling at a wide angle. The other portion of the light which strikes cup 2 between 6 and 9 is reflected directly downward and strikes diffusing bowl 4. Such a typical light ray is G which finally emerges from 4 as G′.

That portion of the light from the light source which strikes the refractor cup 2 between points 9 and 10 (such as ray H) is concentrated by the prisms of the cup into a generally vertical downward direction.

The result is that the bowl 4 receives light over its entire surface in a generally downward direction. This bowl may redistribute the light as desired but a preferred construction is to use prisms of such a character that the light is distributed into the desired directions in the 0°–60° zone, from each small portion of the bowl so that the desired distribution or shape of photometric curve is obtained from every section of the bowl. This will insure that the bowl when viewed from below will approximate an appearance of equal luminosity and the intrinsic brilliancy will generally tend toward the least possible value for a given size of bowl and emitted candle power.

The light rays C, D, G and H, striking the bowl 4, should each be considered as a pencil of light rays rather than a single light ray, because the distribution of the light as indicated by C′, D′, G′ and H′ when emerging from 4 is not obtained from a single point on 4 but from a very small area, the size of this area depending upon the size of the prismatic patterns or other diffusing means used on 4.

I have prevously devised a prismatic construction which is peculiarly adapted to carry out this feature of the unit. This construction is described in patent application No. 77,500, filed December 24, 1925, Patent No. 1,705,943, granted March 19, 1929. It consists of a series of parallel prisms running across the bowl separated by small blank spaces; intersecting this series is another series running in another direction at some predetermined angle with the first series; intersecting both of these would be a third series running at still another angle and possibly a fourth or as many as may be desired to get the effect. The cross section of each prism of each series is designed to give in one plane the desired distribution of light. The resulting effect is that each small portion of the bowl has running across it many prisms at different angles each one distributing the light correctly in a given vertical plane. The distributions mesh together in such a way that when viewed at a short distance the entire bowl appears to be equally luminous, because each small portion of the bowl gives the desired distribution of light.

The reflecting portion of 3 shown in the drawing as a prismatic reflector smooth on its outer surface with prisms on its inner surface is so designed as to insure total reflection from the outer surface when the light is incident as indicated. This is not a necessary construction. Other types of reflectors could be used to accomplish the desired reflection. Nor is it always necessary that part 2 concentrate the light into a generally horizontal direction. In the figure we have shown some spread of this light. Cup 2 is used to co-operate with the reflecting portion of 3 in such a way that the desired downward reflection of light is obtained. The generally cylindrical portion of 2 is intended partially to concentrate the light into directions such that the reflecting portion of 3 can handle it most effectively. Any modification of the prisms of 2 with corresponding modifications of the reflecting portion of 3 so that they still co-operate in performing the function described is considered as coming within the scope of this invention.

The luminair herein described is especially useful for interiors in which any close work is performed, or indeed for almost any interior, because the portion of the luminair which gives the direct light appears illuminated evenly when viewed from any angle, even as low an angle as the nadir. When a luminair appears equally luminous the intrinsic brilliancy is at the lowest possible value for the candle power delivered, since the entire surface is contributing equally to this candle power and intrinsic brilliancy is light intensity divided by the area from which the intensity is obtained (frequently expressed as candle power per square inch). While no one, under ordinary conditions, ever views the lower part of the unit directly at such low angles as the nadir or at 30° or even at higher angles, nevertheless when working on polished surfaces, such as desks, sized papers, etc., the image of the unit is likely to be reflected from the working surface and thus reaches the eye from such low angles. When that portion of the unit contributing to this downward light is equally luminous over its entire surface, the brilliancy of such reflected images is at a minimum and conditions for close work are better than would otherwise be obtained.

The spring holding device for the inner refractor forms a very inexpensive and convenient means for securing the inner glass part in place. In molding the glass, the cup and bowl are provided with short integral bosses adapted to receive the spring 11 as indicated at 15 and 16.

The typical luminair of this character as shown in the figure is not intended to represent the only possible construction and arrangement of parts within the scope of this invention, but is intended to show a preferred construction for this class of luminaires.

I claim:

1. A luminair comprising a light source, a lens element surrounding the source and reducing the divergence of the light in vertical planes, a globe consisting of a reflector and a bottom plate surrounding the lens element and source, the reflector being adapted to reflect the light and deliver it in approximately parallel rays to the bottom plate for transmission thereby.

2. A luminair comprising a light source, a lens element surrounding the source and reducing the divergence of the light in vertical planes, a globe consisting of a reflector and a diffusing bottom plate surrounding the cylindrical member and source, the reflector being adapted to reflect the light and deliver it in approximately parallel rays to the bottom plate for distribution thereby.

3. A luminair comprising a light source, a lens element surrounding the source and reducing the divergence of the light in vertical planes, a globe consisting of a reflector and a prismatic bottom plate surrounding the lens member and source, the reflector being adapted to reflect the light and deliver it in aproximately parallel rays to the bottom plate to obtain substantially the same light distribution from every part of the plate.

4. A luminair comprising a light source, a lens element surrounding the source and reducing the divergence of the light in vertical planes, a globe consisting of a prismatic glass reflector and a diffusing bottom plate surrounding the cylindrical member and source, the reflector having an upper light transmitting section and a lower reflecting section adapted to concentrate the light rays received from the inner member in a vertical direction to the bottom plate for distribution and direction thereby.

5. A luminair comprising a light source, a cylindrical lens element surrounding the source and reducing the divergence of the light in vertical planes, a globe surrounding the cylindrical member and source consisting of a reflector and diffusing bottom plate each provided with prisms on their interior surfaces, the reflector having an upper section provided on its interior with light transmitting prisms and a lower section provided with interior light reflecting prisms adapted to concentrate the light rays received from the inner member in a vertical direction to the interior prisms of the bottom plate for distribution and direction thereby.

6. A luminair comprising a light source, a cylindrical lenticular cup surrounding the source and a globe surrounding the source and the cup, the lenticular corrugations on the side walls of the cup reducing the divergence of the light in vertical planes, and those on the base thereof in vertical direction, the globe consisting of a reflector and diffusing bottom plate each provided with prisms on their interior surfaces, the reflector having an upper section provided on its interior with light transmitting prisms and a lower section provided with interior light reflecting prisms adapted to concentrate the light rays received from the inner member in a vertical direction to the interior prisms of the bottom plate for distribution and direction thereby.

7. A luminair comprising a light source, a cylindrical cup surrounding the source and provided with prisms on its exterior surface and a globe surrounding the source and the cup, the corrugations on the side walls of the cup reducing the divergence of the light in vertical planes and those on the base thereof in vertical directions, the globe consisting of a reflector and diffusing bottom plate each provided with prisms on their interior surfaces, the reflector having an upper section provided on its interior with light transmitting prisms and a lower section provided with interior light reflecting prisms adapted to concentrate the light rays received from the inner member in a vertical direction to the interior prisms of the bottom plate for distribution and direction thereby.

8. A luminair comprising a light source, an outer two part light transmitting glass envelope, external securing means for holding the two parts of the envelope together, a cup-shaped inner glass part, and a compression spring interposed between one of the outer glass parts and the closed bottom of the inner glass part and pressing the edge of the inner part against the other outer part.

9. A luminair comprising a light source, a cup-shaped glass part about the light source, a two part glass envelope enclosing both the light source and cup-shaped part, means to secure the two parts of the envelope together, and spring means acting on one envelope part and the inner cup-shaped part for pressing the edge of the cup-shaped part against the other envelope part.

10. In a luminair, a light source, a two part enclosing envelope, one part having an interiorly disposed annular shoulder while the other has an interiorly disposed axial boss, an inner glass part having an edge engaged with the shoulder and a boss opposite the other boss, a compression spring interposed between the bosses, and securing means for holding the envelope parts together.

11. A luminair comprising a support, a light-transmitting envelope part carried thereby and having an interior annular ledge, a second envelope part detachably secured to the first part, an inner refracting cup whose edge engages the ledge, and a spring between the cup and second envelope part for pressing the cup against the ledge.

Signed at Newark, in the county of Licking and State of Ohio, this 9th day of July, 1931.

THOMAS W. ROLPH.